United States Patent Office 3,840,669
Patented Oct. 8, 1974

3,840,669
PREPARATION OF WHITE PICKLED CHEESE
Edward H. Youssef, Louisville, Ky.
(6650 Vernon Ave., Edina, Minn. 55436)
No Drawing. Filed May 19, 1972, Ser. No. 254,8555
Int. Cl. A23c 19/02
U.S. Cl. 426—36       8 Claims

ABSTRACT OF THE DISCLOSURE

Feta type cheeses are produced by a process involving forming a mixture of raw unpasteurized milk and pasteurized milk, holding the mixture for a short period of time, pasteurizing the mixture, inoculating the mixture with lactic acid starter, holding the inoculated mixture until the desired acidity is produced, adding salt to the inoculated mixture, rennetting the mixture to form a curd, draining the curd and ripening the drained curd.

BACKGROUND OF THE INVENTION

Many hundreds of varieties of cheese are presently made throughout the world. Many modern varieties of said cheeses are produced by the same steps of manufacture established centuries ago. Although these varieties of cheeses are called by hundreds of names, they can all be classified into about twenty groups or types. The present invention relates to an improved process of producing a cheese of uniform quality, both in taste, body and slicing characteristics of the white pickled type. Such cheeses include Domiati cheese, produced in Egypt and Feta cheese produced in the Balkan and Near East countries. This invention relates to a process for producing a white pickled cheese of uniform quality both in flavor, body and slicing characteristics. More particularly, this invention relates to a process and the products produced thereby whereby a white pickled cheese palatable to the North American market can be produced, having acceptable body and storage characteristics.

DESCRIPTION OF THE PRIOR ART

The white cheese produced under the name Feta is quite popular and is manufactured quite extensively in the Balkan and Near East countries. It is a soft cheese, not artificially colored and it may be eaten fresh or ripened. The fresh product is similar to a highly salted domestic cottage type. The ripened product however, is substantially different since curing occurs in a brine solution. The highly salted or pickled product is characterized by its smooth, creamy texture, sliceable body, pleasant acid, salty and slightly rancid or piquant flavor. According to Efthymiou and Mattick, *Journal of Dairy Science*, 47: 593 (1964) the Feta cheese, as traditionally manufactured, often were lacking in uniformity and quality. These writers report high rejection rates due to wide ranges of flavor abnormalities, gassiness and excessive extraneous matter. These cheeses, both the Feta and the Domiati types have been made from a variety of milks including sheep, goats, buffalo and cows. Regardless of the type of milk utilized, it has traditionally been raw or unpasteurized. Starter cultures have not been utilized nor have controlled cooling or other process steps been practiced. Since these cheeses have been made under uncontrolled conditions by small family type operations, the processing steps are variable and product attributes are nonuniform from region to region, from establishment to establishment and even from batch to batch. There has been some study however, into proposed methods of making a uniform product acceptable to the urban market. It is generally accepted that while the white pickled cheeses have taste attributes which appeal to the general palate in this country, the cheese generally is very strong and in many cases, even rancid in taste so that it would not find general acceptance to the uninitiated palate of the North American market. There has been some scientific investigation into the process variables required for producing a uniform product of generally pleasing flavor and appeal under generally acceptable manufacturing conditions than have been traditionally practiced in the manufacture of such products. One of the prerequisites is the use of pasteurized cow's milk rather than the raw milk from other sources utilized traditionally in other countries.

Efthymiou and Mattick reported on making a white pickled or white Feta type cheese using pasteurized milk with commercial lactic acid starter and selected lipolytic enzyme preparations.

Zerfiridis and Kristoffersen, *Journal of Dairy Science*, 51:943 (1968) also made Feta type cheese utilizing a commercial lactic acid starter. A commercial lipase preparation was added to the milk in order to give the cheese its characteristic flavor. Similarly, Sirry and Kosikowski, *International Dairy Congress*, 2:812 (1959) reported on the production of a Domiati cheese made from pasteurized milk. These investigators produced a cheese with a firm body but without flavor. Fahmi and Sharara, *Journal Dairy Research*, 17:312 (1950), reported a detailed description for processing and pickling of Domiati cheese. This method differed in that 5 to 15 percent of salt was added to the milk before rennetting. These investigators mentioned that with the increased addition of salt, rennet coagulation was retarded, a softer curd was formed and the rate of whey drainage decreased. Consequently, the yield was increased since more moisture was retained in the curd. Sharara in *Dairy Science Abstracts* 27:343 (1965) also studied the effect of milk pasteurization and the addition of starter on the yield and composition of Domiati cheese. This study revealed pasteurization increased: moisture, fat in the dry matter, phosphorus, total protein, soluble protein, nonprotein and ammonia nitrogen but decreased the calcium. The effect of these studies generally was to point out that the addition of salt to the milk and pasteurization of the milk tended to increase the yield both by retaining moisture and by retention of certain other constituents. Zerfiridis and Kristoffersen, *Journal Dairy Science* 51:943 (1968) found that Feta cheeses which contained approximately 15 mg./g. greater than $C_4$ fatty acids at 2 months possessed the most desired flavor. Efthymiou and Mattick, loc. cit. indicated that rancid flavor in Feta cheese was associated with free fatty acids $C_2$ through $C_{10}$. Objectionable rancid flavor appeared to develop in cheese with high levels of $C_{12}$ and higher fatty acids. This is in general agreement with Patton, *Journal Dairy Science* 46:856 (1963), who reported that the characteristic aroma of cheddar cheese was due to the volatile fatty acids and that the source of the aroma producing volatile fatty acids was derived through milk fat lipolysis. This is in agreement with Sirry and Kosikowski, loc. cit. who reported that Domiati cheese made from pasteurized milk produced a product of firm body but with no flavor.

In general, while numerous research studies have been made in the field of pickled white cheeses, and certain characteristics and mechanisms as to the flavor producing agents and other factors have been reported, it appears that there has not been provided to the art a process suitable for the commercial production of a pickled white cheese having a combination of taste characteristics and physical characteristics which would establish market acceptance according to the palate and to the marketing procedures indigenous to the urban centers of North America.

SUMMARY OF THE INVENTION

The object of this invention then, is to provide a process for making a cheese of the pickled white variety having uniform taste, flavor and physical characteristics so as to be acceptable to the demanding criteria of the modern metropolitan market. Such a product possesses not only a wholesome and acceptable piquant flavor but possesses a smooth, creamy body with acceptable slicing characteristics and an acceptable storage life. According to the process of this invention, a curd is produced by admixing a feed mixture of raw and pasteurized milk and storing the mixture under relatively ambient conditions for a short period of at least one-half hour and then repasteurizing the mix. After the mix is cooled, to about 35° C., a commercial lactic acid culture comprises a mixture of *Streptococcus lactis* and *Streptococcus cremoris* is added in concentrations of at least 1% and the mix is maintained until the titratable acidity increases to about 0.02%. Salt is then added to the inoculated mixture in concentrations of about between 4 to 6 percent and the mixture is then renneted to form a curd according to standard procedures. After the curd forms in about 2½ hours, it is cut with American knives and transferred to cheese molds where the whey is allowed to drain for a period of about two days. The drained curd may be then stored for about three weeks in a cheese room at a temperature of about 10° C. followed by storage at a reduced temperature of about 4.4° C. but not less than 3 degrees C. for a remaining ripening period of about 4 weeks. This product is a white sliceable mild cheese, having desirable flavor attributes. Typical composition of the product is in weight percent: Moisture 62; Fat 21–22; Total protein 11–12; Soluble protein 2–3; Titratable acidity .6–.7; pH 6.2–6.3; Salt 3–3.5%. The cheese has a mild piquant flavor characteristic of the pickled white cheeses of the Domiati type or Feta type. It is lower in carboxylic acids, amino acids, free ammonia and salt content than the traditional white pickled cheeses.

One of the unique features of the present process is the use of pasteurized and unpasteurized milk in the initial mix. It is believed that the lipolytic action of the agents in the raw milk produce characteristic free fatty acids providing the characteristic piquant but mild flavor of the high quality Feta cheeses. Subsequent pasteurization followed by the sequentially lowered curing temperatures allows the ripening process to proceed to produce a reproducible, highly desirable product having superior physical characteristics. Further, the use of salt as well as pasteurized milk has the added advantage of producing a salt curd which maintains moisture in the curd and therefore produces superior flavor characteristics and superior body. While the theory proposed as to the mechanism through which the desirable features are obtained form no part of this invention, it is believed that the use of a mixture containing some unpasteurized milk during the short, preliminary fermentation step has the unique effect of producing a more or less standardized fat lipolysis utilizing the native lipolytically active organism present in raw milk to produce the characteristic flavor of the white pickled cheeses.

DESCRIPTION OF THE PREFERRED EMBODIMENTS

Despite the reported work of other investigators, my experiments tend to show that it is absolutely necessary to the production of a uniform product of highly desirable flavor characteristics to utilize a mixture of unpasteurized and pasteurized milk in the initial mix. Addition of a commercial lipase enzyme to pasteurized milk produced an unsatisfactory product with a pasty texture. It is possible to obtain a product having generally similar flavor characteristics by use of mixed commercial lactic acid starters with pasteurized milk. However, a product having the proper body and flavor characteristics of a high quality, raw milk Feta cheese has not been produced by these methods. Generally speaking, the ratio of raw milk to pasteurized milk is about one to one. However, considerable variation is possible in the general range of about 1:2 to 2:1. The more preferred range is 2:3 to 3:2. This mixture is maintained under cool ambient conditions for about one hour. These conditions are not rigorous, a suitable temperature being around 60° F. However, the temperature can be raised or lowered with a resulting lengthening or shortening of the holding time. During this time, the native lipolytic agents in the raw milk are believed to act on the fat of the mixture to produce the volatile fatty acids necessary for the subtle and somewhat mildly rancid flavor of the finished product. At the end of the preliminary holding, the mixture is pasteurized by standard technique, the pasteurized milk cooled to about ambient temperature and the mixture inoculated with a commercially available lactic acid culture comprises a mixture of *Streptococcus lactis* and *Streptococcus cremoris*. The inoculated mixture is then held until the titratable acid increases to a point of about 0.02% at which time from four to six percent of salt is added to the inoculated mix. A standard rennet solution is added to the mix and the entire mix allowed to coagulate to form a curd according to standard techniques. The curd is then cut vertically and horizontally and the cut curd is ladled carefully into perforated molds.

In a preferred embodiment, the perforated molds are creole cups, however, a less desirable but satisfactory product has been produced by ladling the curd into American hoops and applying very light pressure to remove the whey. However, for optimum flavor and smooth creamy body, the additional moisture maintained in the salt curd during natural drainage is desired. My invention will be better understood by reference now to the following specific examples.

EXAMPLE 1

Since some investigators have previously suggested the use of pasteurized milk with or without lactic acid starters as a source for the Feta or other pickled white cheeses, the following experiment was made. Six percent (by weight) of salt was added to a batch of pasteurized milk which was then renneted in standard manner until a curd was formed. This required two and one half to three hours. The curd was then cut with American knives, both vertically and horizontally. As is well known, American knives comprise a frame containing a series of spaced wires which act as the cutting edges. The frame which fits adjacent to the walls of a standard cheddar type curd forming vat is pulled through the curd so that the wires cut the curd vertically. The knife is turned 90° and is again pulled through the curd so that the spaced wires cut the curd horizontally. The cut curd was carefully ladled with a cheese scoop into Creole cream cheese plastic cups with permanent bottoms. These cups were made with perforation (⅛ inch in diameter and approximately one half inch apart) on the sides and bottoms for whey drainage. The ladling was done especially carefully, since it was found that excessive curd breakage resulted in slow drainage when the forms were filled. The cheese forms were gently tipped and inverted every ten to twelve hours for two days at room temperature to assist in the expulsion of whey. The curd was then packaged as follows: One portion was wrapped in aluminum foil; another portion was placed in a jar covered with 3% brine and a third portion was sealed in a jar and covered with 3% whey brine and sealed. Duplicate samples were prepared with one stored in a room at room temperature, (21–23° C.) and the others stored at 4.4° C. An organoleptic examination of the product by a panel of trained cheese tasters indicated that none of the cheeses made from the uncultured pasteurized, homogenized milk developed the characteristic flavor or Domiati or Feta cheese even after four weeks of ripening. After the first week, the panel members described the product as lacking flavor, having excessive salt with weak body and coarse texture. After one month, the product was criticised as having no flavor and as being excessively salty. It had, however, improved in its body and slicing characteristics. There was some improvement in cheese flavor in the samples packed in aluminum foil stored at room temperature. The product stored in 3% brine and 3% salted whey at 21° C. developed a harder curd, excessive gassiness, a very salty taste, together with fruity and putrid flavors. Generally speaking, the products produced by these methods were considered unacceptable, lacking in both flavor and firmness of body.

EXAMPLE 2

A batch of cheese was made by the same method as in Example 1, except that the pasteurized milk was inoculated with 1% of a commercial lactic acid culture comprising a mixture of *Streptococcus lactis* and *Streptococcus cremoris*. After one hour the same amount of salt and rennet were added as in Example 1. The resulting curd was cut, the whey drained and the curd was packaged in identical manner as in Example 1. These products generally produced a cheese with less objectionable salt and with some flavor improvement. After one month, the flavor was superior to the uncultured cheese of Example 1. The use of brine and salted whey at 21° C. gave some improvement in cheese body over samples stored at 4.4° C. which lacked in flavor and body firmness. However, the products were considered unacceptable, lacking both in flavor and in the proper body characteristics.

EXAMPLE 3

In order to simulate the typical mild rancid flavor of high quality Feta cheese, new variables were introduced. These variables involved utilizing a mixture of equal amounts of raw and pasteurized milk, which were mixed and allowed to set for one hour in order to allow the natural lipase enzyme in raw milk to react with the homogenized milk fat. This mixture was then pasteurized in order to inactivate the lipase and destroy undesirable organisms present in the raw portion of the milk. The commercial lactic acid culture comprises a mixture of *Streptococcus lactis* and *Streptococcus cremoris* was used in the same one percent concentration and the salt addition, was lowered to 5 percent rather than 6 percent prior to renneting. This material after being packaged and cured resulted in cheese having the highest score by the panel as compared to others for cheese flavor for acceptability of salt when stored at 21–23° for one and two weeks respectively. After one month of ripening, at this temperature cheese packed in aluminum foil at 4.4° C. was rated superior to samples stored at 21° C. in relation to all other samples. All tests using brine comprised of brine and milk or salted whey gave varied results. Those samples stored at 4.4° C. were described as having an unnatural bitter flavor and weak body. A gassy condition was also evident at 21° C. Lack of proper acid development would be related to a weak body at the lower storage temperature. High storage temperatures together with bacteriological contaminants could explain the samples exhibiting gas and bitter flavor. However, it was concluded from this experiment that the use of mixed raw pasteurized milk which produced a limited fat lipolysis before pasteurization produced an end product having the desired piquant flavor characterized by high quality Feta cheese. It was found also that at least one percent of a commercial lactic acid starter was needed to produce proper acidity and flavor characteristics in the final product. Further, packaging in aluminum foil was superior to brine packaging in respect to the flavor development during storage. Five percent salt produced an acceptable product in relation to taste, body and texture.

Further experiments were carried out to evaluate the various lactic acid cultures so that pure strains of *Streptococcus lactis* and *Lactobacillus casei* were combined in various proportions.

EXAMPLE 4

Use of 1:1 concentrations of *Streptococcus lactis* and *Lactobacillus casei* appeared promising, particularly when packed in aluminum foil, stored at 4.4° C. The products that were developed from 1:2 starter mixture resulted in a weak body which was attributed to lack of total acid production. The samples made with 2:1 ratio of *S. lactis* to *L. casei* developed a bitter flavor. This was attributed to an inbalance of growth between the two strains of organisms. The conclusions drawn from this series of experiments indicated that *L. casei* resulted in excessive bitterness i.e. protein degradation.

As has previously been indicated experiments attempting to obtain a limited fat lipolysis through the use of commercial lipase enzyme on pasteurized milk (without raw milk) were unsuccessful.

EXAMPLE 5

To further test on the concentration of the lactic acid strain, a high level of commercial lactic acid culture comprising a mixture of *Streptococcus lactis* and *Streptococcus cremoris* was used (1.5%) and a lower salt concentration of 4% was introduced after the free titratable acid reached the desired level. The results of this experiment confirmed that cheese made by the raw and pasteurized mix scored the highest in all respects during ripening as compared to the pasteurized milk which lacked proper flavor and as compared to the cheeses produced with various levels of *S. lactis* and *L. casei* which produced a pasty curd. It was unanimously agreed that the most palatable product, both from the flavor point of view and from the point of view of smooth body and sliceability characteristics was produced from samples in which 5% salt was dissolved in the milk together with 1.5% commercially mixed strain of lactic acid culture, followed by storage at 10°. It was further found that after the proper curing temperature, if the temperature was then lowered, the shelf life could be improved considerably.

It was also found that curd, which drained naturally in plastic cups, of perforated material, was superior in flavor, body and texture to the curd drained in American cheese hoops. During storage, samples from the product drained in cheese hoops, with or without pressure lacked in both development of flavor and aroma profile. It is postulated that the high moisture level retained in the naturally drained curd was probably conducive to the growth of the proper bacterial flora for optimum flavor development during storage.

In summary, it has been found that samples, packed in perforated cups, stored at 10° C. for three weeks, then transferred to 4.4° but not less than 3 degrees C. for 4 weeks developed a more desirable flavor profile, body and texture and longer shelf life over the samples stored and produced by other methods. Without wishing to be bound by the accuracy of the theories formed herein, it is felt that the mixture of raw and pasteurized milk allows the naturally lipolytic agents in the raw milk to react with the homogenized milk fat to produce the subtle free fatty acids conducive to producing the piquant, nutlike flavor of high quality white pickled cheeses. This action is stopped by pasteurization of the mix in which possibly deleterious organisms in the free milk are also killed. Thereafter, by utilizing a lactic acid culture comprises a mixture of *Streptococcus lactis* and *Streptococcus cermoris*, in weight percentages of from 1% to 1.5%, the proper acid development is begun, which then is decelerated by the addition of from four to six percent salt. The added salt also tends to produce a salt curd which decreases moisture loss and decreases the loss of other important nutrients. After renneting, curd formation and cutting, it has been found that the storage and drainage of the curd through natural drainage rather than expulsion of whey through pressure or compression maintains a proper amount of moisture in the curd which is believed to be conducive to the growth of the proper bacterial flora for optimum flavor and body development. Furthermore, it has been found that airtight storage in aluminum foil or plastic rather than in a brine solution produces a product having better body both from the viewpoint of smoothness and sliceability and having improved flavor characteristics.

It will be apparent to those skilled in the art that I have shown herein a method of preparing a new and improved cheese product which is susceptible to commercial application to produce a product having an agreeable flavor to the modern metropolitan market and a product which can be packaged and which will exhibit a proper shelf life to be assimilated into modern packaging and manufacturing techniques.

While many modifications will occur to those skilled in the art from the detailed descriptions hereinabove given, such description is meant to be exemplary in nature and nonlimiting except so as to be commensurate in scope with the appended claims.

What is claimed is:

1. A process for the manufacture of a white pickled cheese, which comprises the steps of:
   A. providing a starting mixture of raw unpasteurized milk and pasteurized milk in proportions of about 1:2 and 2:1;
   B. maintaining said mixture in the range of ambient temperature for at least one-half hour;
   C. pasteurizing the mixture;
   D. inoculating the pasteurized mixture with at least 1% by weight of a lactic acid starter comprising a mixture of *Streptococcus lactis* and *Streptococcus cremoris* and holding said inoculated mixture until the acidity of the mixture has increased to a point of about .02 percent;
   E. adding from 4 to 6% by weight of salt to the inoculated mixture;
   F. renneting the mixture to form a curd, and;
   G. draining the curd;
   H. ripening the drained curd in the absence of air.

2. A process for the manufacture of a white pickled cheese as defined in Claim 1, the further step of draining the curd without pressure.

3. A process for the manufacture of a white pickled cheese, as defined in Claim 2, the further step of maintaining the curd at ambient temperature during the draining period.

4. A process for the manufacture of white pickled cheese, as defined in Claim 1, the further step in draining the curd by placing said curd in a container having spaced perforations, and gently tipping and inverting said container during the draining period.

5. A process for the manufacture of a white pickled cheese, as defined in Claim 1, the step of ripening said drained curd in timed increments of sequentially lower temperature.

6. The process for the manufacture of white pickled cheese, as defined in Claim 1, the step of packing said drained curd in waterproof and air impervious packages.

7. The process for the manufacture of white pickled cheese, as defined in Claim 6, in which said waterproof and air impervious packages are fabricated of aluminum foil.

8. The process for the manufacture of a white pickled cheese, as defined in Claim 1, the step of holding said drained curd at a temperature of about 10° C. for about three weeks and then holding said curd at a substantially lower temperature of not less than 3° C. for several more weeks.

References Cited

UNITED STATES PATENTS 3,525,629    8/1970    Kosikowski  ---------- 99—212

OTHER REFERENCES

Sanders G. P., Cheese Varieties and Descriptions, U.S. Department of Agriculture, AGR. Handbook No. 54, 1953 (p. 39) (Copy Gr. 172).

Zerfiridis, et al., Feta Cheese from Pasteurized Cow's Milk, J. of Diary Science, vol. 51, 1968 (p. 943) SF221J8.

DAVID M. NAFF, Primary Examiner

U.S. Cl. X.R.

426—40